(12) United States Patent
Huang et al.

(10) Patent No.: US 11,003,507 B2
(45) Date of Patent: May 11, 2021

(54) MAPREDUCE JOB RESOURCE SIZING USING ASSESSMENT MODELS

(71) Applicant: HUAWEI TECHNOLOGIES CO., LTD., Guangdong (CN)

(72) Inventors: Guowei Huang, Shenzhen (CN); Liqun Deng, Shenzhen (CN); Jiansheng Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 16/369,564

(22) Filed: Mar. 29, 2019

(65) Prior Publication Data

US 2019/0227853 A1 Jul. 25, 2019

Related U.S. Application Data

(63) Continuation of application No. PCT/CN2017/090038, filed on Jun. 26, 2017.

(30) Foreign Application Priority Data

Sep. 30, 2016 (CN) .......................... 201610878801.7

(51) Int. Cl.
*G06F 9/50* (2006.01)

(52) U.S. Cl.
CPC ............ *G06F 9/5083* (2013.01); *G06F 9/505* (2013.01); *G06F 9/5027* (2013.01); *G06F 9/5038* (2013.01); *G06F 9/5055* (2013.01)

(58) Field of Classification Search
CPC ...... G06F 9/5083; G06F 9/5055; G06F 9/505; G06F 9/5027; G06F 9/5038
See application file for complete search history.

(56) References Cited

U.S. PATENT DOCUMENTS

| 10,073,880 B2 * | 9/2018 | Li | G06F 9/5044 |
| 2012/0198466 A1 * | 8/2012 | Cherkasova | G06F 9/5066 |
| | | | 718/104 |

(Continued)

FOREIGN PATENT DOCUMENTS

| CN | 101938416 A | 1/2011 |
| CN | 102629219 A | 8/2012 |

(Continued)

OTHER PUBLICATIONS

Extended European Search Report issued in European Application No. 17854483.9 dated Aug. 8, 2019, 9 pages.

(Continued)

*Primary Examiner* — Benjamin C Wu
(74) *Attorney, Agent, or Firm* — Fish & Richardson P.C.

(57) ABSTRACT

The present disclosure relates to computing resource allocation methods, devices, and systems. One example system includes a management node and a target computing node. The management node is configured to obtain M computing tasks and establish a resource assessment model, and send one or more computing tasks of the M computing tasks and information about the resource assessment model to the target computing node. The target computing node is configured to receive the one or more computing tasks and the information about the resource assessment model, substitute input data of a particular computing stage of a target task into the resource assessment model to compute a resource size required for the particular computing stage, and compute the input data by using a computing resource that is of the resource size and that is in a preset resource pool.

33 Claims, 6 Drawing Sheets

FIG. 2

(56) References Cited

U.S. PATENT DOCUMENTS

| | | | |
|---|---|---|---|
| 2013/0104140 A1* | 4/2013 | Meng | G06F 9/4881 718/104 |
| 2013/0268941 A1* | 10/2013 | Cherkasova | G06F 9/5066 718/104 |
| 2014/0289733 A1* | 9/2014 | Fritz | G06F 9/5066 718/104 |
| 2015/0199208 A1* | 7/2015 | Huang | G06F 9/44505 718/1 |
| 2015/0199216 A1* | 7/2015 | Cao | G06F 9/5027 718/104 |
| 2015/0227393 A1* | 8/2015 | Fuller | G06F 9/5011 718/104 |
| 2015/0277980 A1* | 10/2015 | Ovsiankin | G06F 9/5066 718/104 |
| 2016/0062929 A1* | 3/2016 | Yeh | G06F 13/364 710/110 |
| 2016/0188594 A1* | 6/2016 | Ranganathan | G06F 9/5066 707/769 |
| 2016/0212007 A1* | 7/2016 | Alatorre | H04L 41/04 |
| 2017/0017521 A1* | 1/2017 | Gupta | G06F 9/4881 |
| 2017/0024251 A1 | 1/2017 | Yi | |
| 2017/0109199 A1* | 4/2017 | Chen | G06F 9/5027 |
| 2017/0134304 A1* | 5/2017 | Lin | G06F 9/00 |
| 2018/0026913 A1* | 1/2018 | Balle | G06F 3/0625 709/226 |
| 2018/0032375 A1 | 2/2018 | Tan et al. | |
| 2018/0060128 A1* | 3/2018 | Liu | G06F 9/4881 |

FOREIGN PATENT DOCUMENTS

| | | |
|---|---|---|
| CN | 103098027 A | 5/2013 |
| CN | 103701886 A | 4/2014 |
| CN | 104407921 A | 3/2015 |
| CN | 104731595 A | 6/2015 |
| CN | 104834561 A | 8/2015 |
| CN | 104951372 A | 9/2015 |
| CN | 104978228 A | 10/2015 |
| CN | 105022670 A | 11/2015 |
| EP | 1630671 A1 | 3/2006 |
| JP | 2004046372 A | 2/2004 |

OTHER PUBLICATIONS

Decap et al., "Halvade: scalable sequence analysis with MapReduce," Bioinformatics Advance Access published Apr. 15, 2015, 7 pages.

Liu et al., "Dreams: Dynamic resource allocation for MapReduce with data skew," 2015 IFIP/IEEE International Symposium on Integrated Network Management (IM), Jul. 2015, 9 pages.

Guo et al. "FlexSlot: Moving Hadoop into the Cloud with Flexible Slot Management," SC14: International Conference for High Performance Computing, Networking, Storage and Analysis, Nov. 2014, 11 pages.

Apache Software Foundation [online], "Support changing resources of an allocated container," Hadoop YARN: YARN-1197, last updated Jan. 31, 2019, [retrieved on Jun. 14, 2019], retrieved from: URL <https://issues.apache.org/iira/browse/YARN-1197>, 32 pages.

PCT International Search Report and Written Opinion issued in International Application No. PCT/CN2017/090038 dated Sep. 28, 2017, 20 pages (with English translation).

Mao et al., "A Fine-Grained and Dynamic MapReduce Task Scheduling Scheme for the Heterogeneous Cloud Environment," 2015 14th International Symposium on Distributed Computing and Applications for Business Engineering and Science (DCABES), Aug. 18-24, 2015, 4 pages.

Haiwen, "Researches on Optimization of Resource Allocation for MapReduce Scheduling," Dissertation submitted for the Degree of Doctor of Philosopy, South China University of Technology, 2014, 182 pages (partial English translation).

Office Action issued in Chinese Application No. 201610878801.7 dated Jan. 4, 2021, 8 pages.

\* cited by examiner

MAPREDUCE JOB RESOURCE SIZING USING ASSESSMENT MODELS

CROSS-REFERENCE TO RELATED APPLICATIONS

This application is a continuation of International Application No. PCT/CN2017/090038, filed on Jun. 26, 2107, which claims priority to Chinese Patent Application No. 201610878801.7, filed on Sep. 30, 2016. The disclosures of the aforementioned applications are hereby incorporated by reference in their entireties.

TECHNICAL FIELD

The present invention relates to the field of computer technologies, and in particular, to a resource allocation method, a related device, and a system.

BACKGROUND

Hadoop is a distributed system infrastructure developed by the Apache Foundation, and can perform distributed processing on a large amount of data. A core design of Hadoop is a Hadoop distributed file system (English: Hadoop Distributed File System, HDFS for short) and a MapReduce programming model. The HDFS provides storage for massive volumes of data, and MapReduce provides computing for massive volumes of data. Generally, MapReduce of Hadoop processes a group of input key-value pairs (key/value pairs), and after processing by using a MapReduce function specified by a user, finally outputs a group of key-value pairs. MapReduce actually defines a map function interface and a reduce function interface, a map function is used to convert an input record to obtain an intermediate result, and a reduce function is used to convert an intermediate result to a final result. Therefore, the user simply specifies the map function and the reduce function by using a parameter to compute data. As shown in FIG. 1, a map task (Map task) in the figure is implemented by the map function, and a reduce task (Reduce task) in the figure is implemented by the reduce function.

DREAMS is a resource scheduling framework that extends a Yet Another Resource Negotiator (English: Yet Another Resource Negotiator, YARN for short). As shown in FIG. 2, DREAMS is used to resolve a problem of resource allocation imbalance at a reduce stage in MapReduce. In DREAMS, the following is proposed: Real-time prediction is performed on a size of a data volume processed by each reduce task, and then a size of a computing resource container required when each reduce task is executed is assessed by using a task performance assessment model based on the size of the data volume. An execution procedure thereof is as follows:

Step 1: Each node manager (English: NodeManager, NM for short) runs a partition size monitor (Partition Size Monitor) module to monitor data information output by all map tasks, and send the data information to a partition size predictor (Partition Size Predictor) module at an application master (English: Application Master, AM for short) end by using a heartbeat of the NM.

Step 2: The partition size predictor receives data information sent by partition size monitors on all NMs, and performs real-time prediction on a data volume size of each reduce task according to the data information.

Step 3: A task duration estimator on the AM establishes, according to a data volume size of each reduce, a resource model used for computing a resource size.

Step 4: A resource allocator (Resource Allocator) module on the AM predicts, according to the data volume size of each reduce task by using the resource model, a size of a computing resource required for each reduce task.

Step 5: The AM communicates with a fine-grained container scheduler (Fine-grained Container Scheduler) communication module on a resource manager (English: ResourceManager, RM for short), to apply for a computing resource container required for each reduce task.

Step 6: The AM notifies, to a computing node on which each reduce task is distributed, the computing resource required for each reduce task.

Step 7: The computing node on which each reduce is located executes the reduce task according to a specified computing resource.

A disadvantage of the prior art lies in that execution of some reduce tasks is divided into multiple computing stages, and complexities of algorithms used for computing at the computing stages are different. Correspondingly, computing resources required for computing at the computing stages may also be different. If a required computing resource is allocated to an entire execution stage of a reduce task before the reduce task is executed, a waste of the computing resource is caused.

SUMMARY

Embodiments of the present invention disclose a resource allocation method, a related device, and a system, so as to improve computing resource utilization.

According to a first aspect, an embodiment of the present invention provides a MapReduce-based distributed system, and the system includes a management node and a target computing node. The management node is configured to: obtain M computing tasks, and establish a resource assessment model according to a data size of the M computing tasks; and send some computing tasks of the M computing tasks and information about the resource assessment model to the target computing node, where computing at P computing stages needs to be performed in each computing task, M is greater than 1, and P is greater than 1. The target computing node is configured to: receive the some computing tasks and the information about the resource assessment model that are sent by the management node; obtain the resource assessment model according to the information about the resource assessment model, and before executing each computing stage of a target task, substitute input data of the computing stage into the resource assessment model to compute a resource size of a computing resource required for the computing stage; and compute the input data by using a computing resource that is of the resource size and that is in a preset resource pool, where the target task is any computing task of the some computing tasks.

By performing the foregoing steps, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the first aspect, in a first possible implementation of the first aspect, the management node is further configured to send, to the computing node, information about an initial computing resource allocated to each computing task of the some computing tasks; and the target computing node is further configured to: receive the information about the initial computing resource allocated to each computing task, and register, with the resource pool for use, the initial computing resource allocated to each computing task.

With reference to the first aspect, or the first possible implementation of the first aspect, in a second possible implementation of the first aspect, that the target computing node computes the input data by using a computing resource that is of the resource size and that is in a preset resource pool is specifically: substituting the resource size into a preset priority algorithm to compute a priority of each computing stage, and determining whether the priority of the computing stage is higher than a preset priority threshold, where the priority is used to reflect significance of the computing stage; or determining whether the resource size is less than or equal to a quantity of remaining computing resources in the preset resource pool; and if the priority of the computing stage is higher than the preset priority threshold, or the resource size is less than or equal to the quantity of remaining computing resources in the preset resource pool, computing the input data by using the computing resource that is of the resource size and that is in the resource pool.

With reference to the first aspect, or the first possible implementation of the first aspect, or the second possible implementation of the first aspect, in a third possible implementation of the first aspect, the computing node is further configured to release the computing resource of the resource size to the resource pool after computing the input data.

With reference to the first aspect, or the first possible implementation of the first aspect, or the second possible implementation of the first aspect, or the third possible implementation of the first aspect, in a fourth possible implementation of the first aspect, the task size includes at least one of a data volume size, a coverage depth, or a record quantity.

With reference to the first aspect, or the first possible implementation of the first aspect, or the second possible implementation of the first aspect, or the third possible implementation of the first aspect, or the fourth possible implementation of the first aspect, in a fifth possible implementation of the first aspect, the computing task includes a map map task or a reduce reduce task.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation of the first aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is an assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

According to a second aspect, an embodiment of the present invention provides a management node, where the management node is a management node in a MapReduce-based distributed system. The management node includes:
an obtaining unit, configured to: obtain M computing tasks, and establish a resource assessment model according to a data size of the M computing tasks; and
a sending unit, configured to send some computing tasks of the M computing tasks and information about the resource assessment model to a target computing node, where each computing task of the some computing tasks needs to be computed by using P computing stages, M is greater than 1, and P is greater than 1, where: the target computing node is configured to: obtain the resource assessment model according to the information about the resource assessment model, and before executing each computing stage of a target task, substitute input data of the computing stage into the resource assessment model to compute a resource size of a computing resource required for the computing stage; and the target computing node is further configured to compute the input data by using a computing resource that is of the resource size and that is in a preset resource pool, where the target task is any computing task of the some computing tasks, and the target computing node is a computing node in the MapReduce-based distributed system.

By running the foregoing units, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the second aspect, in a first possible implementation of the second aspect, the sending unit is further configured to send, to the computing node, information about an initial computing resource allocated to each computing task of the some computing tasks, so that the computing node registers, into the resource pool for use, the initial computing resource allocated to each computing task.

With reference to the second aspect, or the first possible implementation of the second aspect, in a second possible implementation of the second aspect, the task size includes at least one of a data volume size, a coverage depth, or a record quantity.

With reference to the second aspect, or the first possible implementation of the second aspect, or the second possible implementation of the second aspect, in a third possible implementation of the second aspect, the computing task includes a map map task or a reduce reduce task.

With reference to the second aspect, or the first possible implementation of the second aspect, or the second possible implementation of the second aspect, or the third possible implementation of the second aspect, in a fourth possible implementation of the second aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and [$C_{ref}$*R/R_ref] represents rounding of $C_{ref}$*R/R_ref.

According to a third aspect, an embodiment of the present invention provides a target computing node, where the target computing node is a computing node in a MapReduce-based distributed system. The target computing node includes: a receiving unit, configured to receive some computing tasks and information about a resource assessment model that are sent by a management node, where the management node is a management node in the MapReduce-based distributed system, and the management node is configured to: obtain M computing tasks, and establish the resource assessment model according to a task size of the M computing tasks, where the some computing tasks are computing tasks of the M computing tasks, each computing task of the some computing tasks needs to be computed by using P computing stages, M is greater than 1, and P is greater than 1; a computing unit, configured to: obtain the resource assessment model according to the information about the resource assessment model, and before executing each computing stage of a target task, substitute input data of the computing stage into the resource assessment model to compute a resource size of a computing resource required for the computing stage; and a processing unit, configured to compute the input data by using a computing resource that is of the resource size and that is in a preset resource pool, where the target task is any computing task of the some computing tasks.

By running the foregoing units, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the third aspect, in a first possible implementation of the third aspect, the receiving unit is further configured to: receive information, sent by the management node, about an initial computing resource allocated to each computing task of the some computing tasks, and register, into the resource pool for use, the initial computing resource allocated to each computing task.

With reference to the third aspect, or the first possible implementation of the third aspect, in a second possible implementation of the third aspect, the processing unit is specifically configured to: substitute the resource size into a preset priority algorithm to compute a priority of each computing stage, and determine whether the priority of the computing stage is higher than a preset priority threshold, where the priority is used to reflect significance of the computing stage; or determine whether the resource size is less than or equal to a quantity of remaining computing resources in the preset resource pool; and if the priority of the computing stage is higher than the preset priority threshold, or the resource size is less than or equal to the quantity of the remaining computing resources in the preset resource pool, compute the input data by using the computing resource that is of the resource size and that is in the resource pool.

With reference to the third aspect, or the first possible implementation of the third aspect, or the second possible implementation of the third aspect, in a third possible implementation of the third aspect, the target computing node further includes: a release unit, configured to release the computing resource of the resource size to the resource pool after completing computing the input data.

With reference to the third aspect, or the first possible implementation of the third aspect, or the second possible implementation of the third aspect, or the third possible implementation of the third aspect, in a fourth possible implementation of the third aspect, the task size includes at least one of a data volume size, a coverage depth, or a record quantity.

With reference to the third aspect, or the first possible implementation of the third aspect, or the second possible implementation of the third aspect, or the third possible implementation of the third aspect, or the fourth possible implementation of the third aspect, in a fifth possible implementation of the third aspect, the computing task includes a map map task or a reduce reduce task.

With reference to the third aspect, or the first possible implementation of the third aspect, or the second possible implementation of the third aspect, or the third possible implementation of the third aspect, or the fourth possible implementation of the third aspect, or the fifth possible implementation of the third aspect, in a sixth possible implementation of the third aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and [$C_{ref}$*R/R_ref] represents rounding of $C_{ref}$*R/R_ref.

According to a fourth aspect, an embodiment of the present invention provides a management node, where the management node is a management node in a MapReduce-based distributed system. The management node includes a processor, a memory, and a communications interface. The memory is configured to store data and a program. The processor invokes the program in the memory to perform the following operations: obtaining M computing tasks, and establishing a resource assessment model according to a data size of the M computing tasks; and sending, by using the communications interface, some computing tasks of the M computing tasks and information about the resource assessment model to a target computing node, where each computing task of the some computing tasks needs to be computed by using P computing stages, M is greater than 1, and P is greater than 1. The target computing node is configured to: obtain the resource assessment model according to the information about the resource assessment model, and before executing each computing stage of a target task, substitute input data of the computing stage into the resource assessment model to compute a resource size of a computing resource required for the computing stage. The target computing node is further configured to compute the input data by using a computing resource that is of the resource size and that is in a preset resource pool, where the target task is any computing task of the some computing tasks.

By performing the foregoing steps, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the fourth aspect, in a first possible implementation of the fourth aspect, the processor is further configured to send, by using the communications interface to the computing node, information about an initial computing resource allocated to each computing task of the some computing tasks, so that the computing node registers, into the resource pool for use, the initial computing resource allocated to each computing task.

With reference to the fourth aspect, or the first possible implementation of the fourth aspect, in a second possible implementation of the fourth aspect, the task size includes at least one of a data volume size, a coverage depth, or a record quantity.

With reference to the fourth aspect, or the first possible implementation of the fourth aspect, or the second possible implementation of the fourth aspect, in a third possible implementation of the fourth aspect, the computing task includes a map map task or a reduce reduce task.

With reference to the fourth aspect, or the first possible implementation of the fourth aspect, or the second possible implementation of the fourth aspect, or the third possible implementation of the fourth aspect, in a fourth possible implementation of the fourth aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

According to a fifth aspect, an embodiment of the present invention provides a target computing node, where the target computing node is a computing node in a MapReduce-based distributed system. The target computing node includes a processor, a memory, and a communications interface. The memory is configured to store data and a program. The processor invokes the program in the memory to perform the following operations: receiving, by using the communications interface, some computing tasks and information about a resource assessment model that are sent by a management node, where the management node is configured to: obtain M computing tasks, and establish the resource assessment model according to a task size of the M computing tasks, where the some computing tasks are computing tasks of the M computing tasks, each computing task of the some computing tasks needs to be computed by using P computing stages, M is greater than 1, and P is greater than 1; obtaining the resource assessment model according to the information about the resource assessment model, and before executing each computing stage of a target task, substituting input data of the computing stage into the resource assessment model to compute a resource size of a computing resource required for the computing stage; and computing the input data by using a computing resource that is of the resource size and that is in a preset resource pool, where the target task is any computing task of the some computing tasks.

By performing the foregoing steps, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the fifth aspect, in a first possible implementation of the fifth aspect, the processor is further configured to: receive, by using the communications interface, information, sent by the management node, about an initial computing resource allocated to each computing task of the some computing tasks, and register, into the resource pool for use, the initial computing resource allocated to each computing task.

With reference to the fifth aspect, or the first possible implementation of the fifth aspect, in a second possible implementation of the fifth aspect, that the processor computes the input data by using a computing resource that is of the resource size and that is in a preset resource pool is specifically: substituting the resource size into a preset priority algorithm to compute a priority of each computing stage, and determining whether the priority of the computing stage is higher than a preset priority threshold, where the priority is used to reflect significance of the computing stage; or determining whether the resource size is less than or equal to a quantity of remaining computing resources in the preset resource pool; and if the priority of the computing stage is higher than the preset priority threshold, or the resource size is less than or equal to the quantity of remaining computing resources in the preset resource pool, computing the input data by using the computing resource that is of the resource size and that is in the resource pool.

With reference to the fifth aspect, or the first possible implementation of the fifth aspect, or the second possible implementation of the fifth aspect, in a third possible implementation of the fifth aspect, the processor is further configured to release the computing resource of the resource size to the resource pool after completing computing the input data.

With reference to the fifth aspect, or the first possible implementation of the fifth aspect, or the second possible implementation of the fifth aspect, or the third possible implementation of the fifth aspect, in a fourth possible implementation of the fifth aspect, the task size includes at least one of a data volume size, a coverage depth, or a record quantity.

With reference to the fifth aspect, or the first possible implementation of the fifth aspect, or the second possible implementation of the fifth aspect, or the third possible implementation of the fifth aspect, or the fourth possible implementation of the fifth aspect, in a fifth possible implementation of the fifth aspect, the computing task includes a map map task or a reduce reduce task.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, in a sixth possible implementation of the fifth aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

According to a sixth aspect, an embodiment of the present invention provides a resource allocation method, where the method is applied to a MapReduce-based distributed system, and the system includes a management node and a target computing node. The method includes: obtaining, by the management node, M computing tasks, and establishing a resource assessment model according to a data size of the M computing tasks; and sending, by the management node, some computing tasks of the M computing tasks and information about the resource assessment model to the target computing node, where each computing task of the some computing tasks needs to be computed by using P computing stages, M is greater than 1, and P is greater than 1. The target computing node is configured to: obtain the resource assessment model according to the information about the resource assessment model, and before executing each computing stage of a target task, substitute input data of the computing stage into the resource assessment model to compute a resource size of a computing resource required for the computing stage. The target computing node is further configured to compute the input data by using a computing resource that is of the resource size and that is in a preset resource pool, where the target task is any computing task of the some computing tasks.

By performing the foregoing steps, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the sixth aspect, in a first possible implementation of the sixth aspect, the method further includes: sending, by the management node to the computing node, information about an initial computing resource allocated to each computing task of the some computing tasks, so that the computing node registers, into the resource pool for use, the initial computing resource allocated to each computing task.

With reference to the sixth aspect, or the first possible implementation of the sixth aspect, in a second possible implementation of the sixth aspect, the task size includes at least one of a data volume size, a coverage depth, or a record quantity.

With reference to the sixth aspect, or the first possible implementation of the sixth aspect, or the second possible implementation of the sixth aspect, in a third possible implementation of the sixth aspect, the computing task includes a map map task or a reduce reduce task.

With reference to the sixth aspect, or the first possible implementation of the sixth aspect, or the second possible implementation of the sixth aspect, or the third possible implementation of the sixth aspect, in a fourth possible implementation of the sixth aspect, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is an assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

According to a seventh aspect, an embodiment of the present invention provides a resource allocation method, where the method is applied to a MapReduce-based distributed system, and the system includes a management node and a target computing node. The method includes: receiving, by the target computing node, some computing tasks and information about a resource assessment model that are sent by a management node, where the management node is configured to: obtain M computing tasks, and establish the resource assessment model according to a task size of the M computing tasks, where the some computing tasks are computing tasks of the M computing tasks, each computing task of the some computing tasks needs to be computed by using P computing stages, M is greater than 1, and P is greater than 1; obtaining, by the target computing node according to the information about the resource assessment model, the resource assessment model, and before executing each computing stage of a target task, substituting input data of the computing stage into the resource assessment model to compute a resource size of a computing resource required for the computing stage; and computing, by the target computing node, the input data by using a computing resource that is of the resource size and that is in a preset resource pool, where the target task is any computing task of the some computing tasks.

By performing the foregoing steps, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

With reference to the seventh aspect, in a first possible implementation of the seventh aspect, the method further includes: receiving, by the computing node, information, sent by the management node, about an initial computing resource allocated to each computing task of the some computing tasks, and register, into the resource pool for use, the initial computing resource allocated to each computing task.

With reference to the seventh aspect, or the first possible implementation of the seventh aspect, in a second possible implementation of the seventh aspect, that the target computing node computes the input data by using a computing resource that is of the resource size and that is in a preset resource pool includes: substituting the resource size into a preset priority algorithm to compute a priority of each computing stage, and determining whether the priority of the computing stage is higher than a preset priority threshold, where the priority is used to reflect significance of the computing stage; or determining whether the resource size is less than or equal to a quantity of remaining computing resources in the preset resource pool; and if the priority of the computing stage is higher than the preset priority threshold, or the resource size is less than or equal to the quantity of remaining computing resources in the preset resource pool, computing the input data by using the computing resource that is of the resource size and that is in the resource pool.

With reference to the seventh aspect, or the first possible implementation of the seventh aspect, or the second possible implementation of the seventh aspect, in a third possible implementation of the seventh aspect, the method further includes: releasing, by the computing node, the computing resource of the resource size to the resource pool after completing computing the input data.

With reference to the seventh aspect, or the first possible implementation of the seventh aspect, or the second possible implementation of the seventh aspect, or the third possible implementation of the seventh aspect, in a fourth possible implementation of the seventh aspect, the task size includes at least one of a data volume size, a coverage depth, or a record quantity.

With reference to the seventh aspect, or the first possible implementation of the seventh aspect, or the second possible implementation of the seventh aspect, or the third possible implementation of the seventh aspect, or the fourth possible implementation of the seventh aspect, in a fifth possible implementation of the seventh aspect, the computing task includes a map map task or a reduce reduce task.

With reference to the seventh aspect, or the first possible implementation of the seventh aspect, or the second possible implementation of the seventh aspect, or the third possible implementation of the seventh aspect, or the fourth possible implementation of the seventh aspect, or the fifth possible implementation of the seventh aspect, in a sixth possible implementation of the seventh aspect, the resource assessment model is used to assess, according to a size of the input data, a resource size of a computing resource required for computing the input data, where when $C_{max} > C_{ref} * R / R\_ref > C_{min}$, $C_{new} = [C_{ref} * R / R\_ref]$; when $C_{ref} * R / R\_ref \geq C_{max}$, $C_{new} = C_{max}$; or when $C_{ref} * R / R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref} * R / R\_ref]$ represents rounding of $C_{ref} * R / R\_ref$.

According to an eighth aspect, an embodiment of the present invention provides a storage medium, where the storage medium is configured to store an instruction, and when the instruction runs on a management node, the management node performs the method according to the sixth aspect or any possible implementation of the sixth aspect.

According to a ninth aspect, an embodiment of the present invention provides a storage medium, where the storage medium is configured to store an instruction, and when the instruction is run on a computing node, the computing node performs the method according to the seventh aspect or any possible implementation of the seventh aspect.

According to implementation of the embodiments of the present invention, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

BRIEF DESCRIPTION OF DRAWINGS

The following briefly describes the accompanying drawings required for the background or embodiments.

DESCRIPTION OF EMBODIMENTS

The following describes the technical solutions in the embodiments of the present invention with reference to the accompanying drawings in the embodiments of the present invention.

Figure 1:
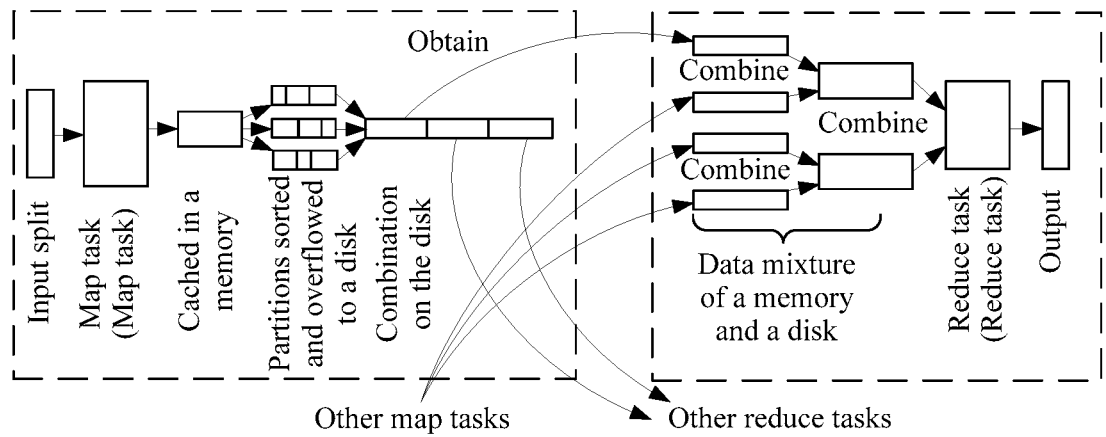
FIG. 1 is a schematic computing flowchart of a MapReduce task according to an embodiment of the present invention.
Figure 2:
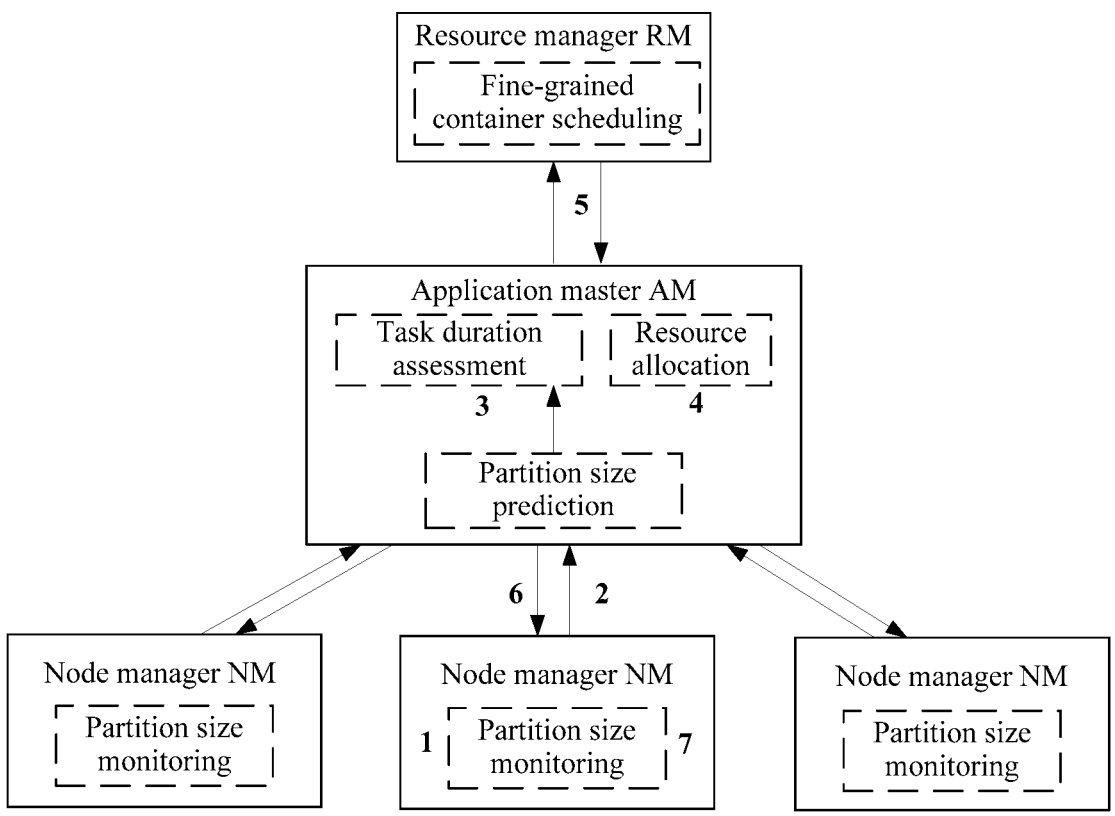
FIG. 2 is a schematic diagram of a scenario for executing a MapReduce task according to an embodiment of the present invention.
Figure 3:
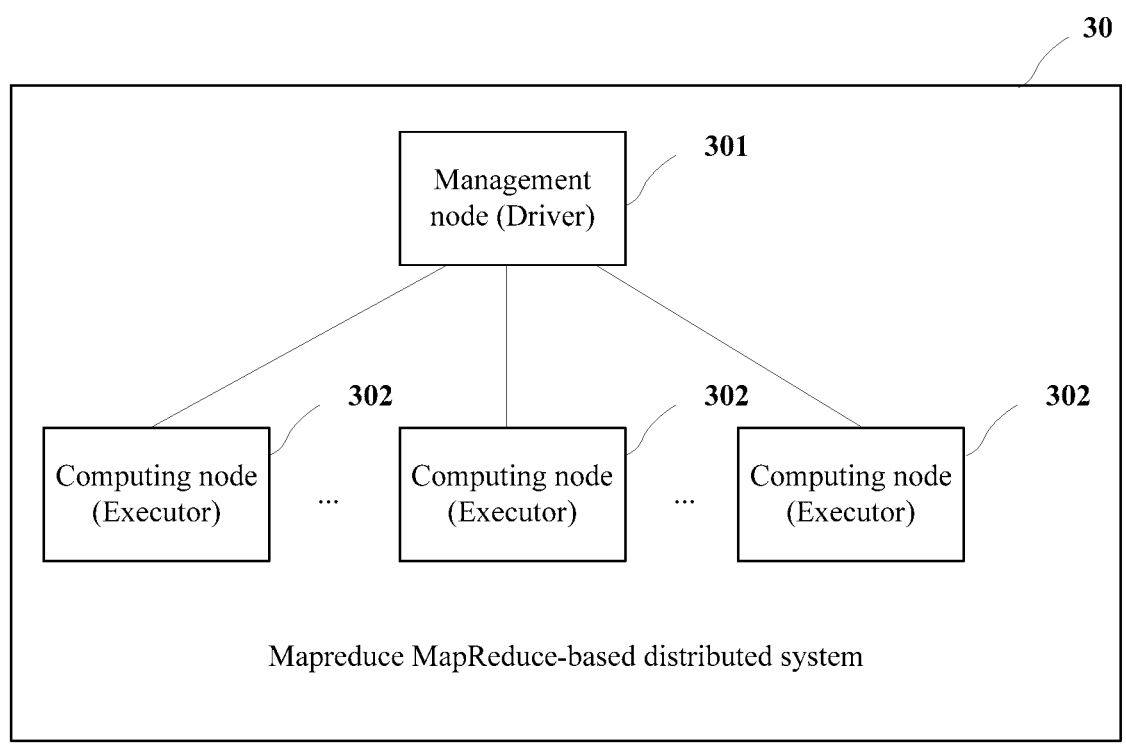
FIG. 3 is a schematic structural diagram of a distributed system according to an embodiment of the present invention.

Referring to FIG. 3, FIG. 3 is a schematic structural diagram of a MapReduce-based distributed system 30 according to an embodiment of the present invention. The system 30 includes a management node 301 and a computing node 302. There may be multiple management nodes 301 and multiple computing nodes 302 in actual application. This embodiment of the present invention uses one management node 301 as an example to describe how to execute a map task and a reduce task of MapReduce based on the system 30. It should be noted that, the management node 301 and the computing node 302 in this embodiment of the present invention may be two types of nodes in a Spark architecture. Currently, the Spark architecture has the following several modes: a Standalone mode, a Spark On YARN mode, and a Spark On Mesos mode. In any one of the modes, there are a Driver process and an Executor process. The management node 301 in this embodiment of the present invention is configured to run the Driver process, and the computing node 301 is configured to run the Executor process. The management node 301 is configured to allocate, to multiple computing nodes for specific execution, a job (Job) allocated to the management node 301 for management.

Figure 4:
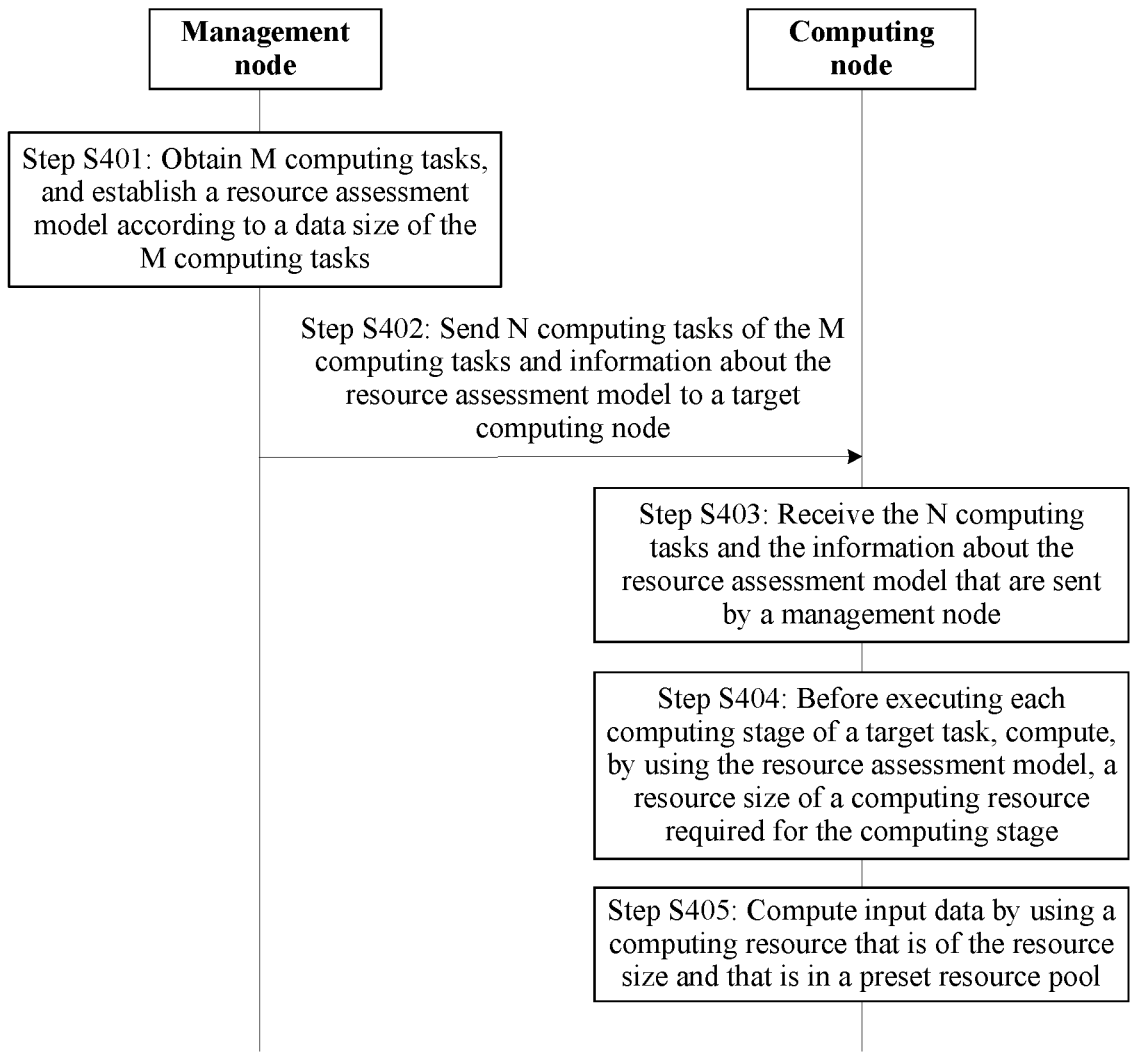
FIG. 4 is a schematic flowchart of a computing resource allocation method according to an embodiment of the present invention.

Referring to FIG. 4, FIG. 4 is a schematic flowchart of a computing resource allocation method according to an embodiment of the present invention. The method may be specifically implemented based on the foregoing system 30, and the method includes but is not limited to the following steps.

S401: The management node obtains M computing tasks, and establishes a resource assessment model according to a data size of the M computing tasks.

Specifically, the M computing tasks may be a map task or a reduce task. Generally, a client (Client) sends a processing request for a job (Job) to a master node (for example, an RM in the Spark On YARN mode) in the spark architecture, and the request further indicates that the management node is a main control node of the job. The master node distributes, according to the processing request, M computing tasks (task) included in the job to the management node for management, and the computing task is the foregoing reduce task (reduce task) or map task (map task).

Correspondingly, the management node obtains information about the M computing tasks, and collects statistics about a data size of the M computing tasks according to the information. The data size of the M computing tasks may be a total data volume size of the M computing tasks. The data size of the M computing tasks may alternatively be a total quantity of records included in the M computing tasks, and each computing task may be specifically divided into multiple records. When the present invention is applied to a gene (Gene) analysis technology, the data size of the M computing tasks may be a coverage depth of the M computing tasks. Due to problems such as a gap (gap) of a large fragment splicing, a limited sequencing read length, and a repeated sequence in gene sequencing, a gene sequence obtained by assembly after a gene sequencing analysis usually cannot cover an entire genome. The coverage depth is a proportion of the gene sequence obtained by analysis in the entire genome. For example, if a sequencing coverage depth of a genome of a person is 98.5%, it indicates that 1.5% of a gene sequence in the genome cannot be obtained by assembly and analysis.

In this embodiment of the present invention, computing at P computing stages needs to be performed in each computing task, and input data of a computing stage may include output data of another computing stage. Output data of the computing stage may belong to an input of still another computing stage. Output data is, after the P computing stages are executed, a computing result of the computing task, where M is greater than 1, and P is greater than 1. For example, in the gene (Gene) analysis technology, a mapping (mapping) operation of a sequence for deoxyribonucleic acid (English: Deoxyribo Nucleic Acid, DNA for short) sequencing belongs to the foregoing map task, and variant calling (Variant Calling) of a chromosomal region belongs to the foregoing reduce task. The variant calling (Variant Calling) of the chromosomal region includes a repetition marking stage (a MarkDuplicate tool needs to be invoked), a partial comparison and base correction stage (a LocalRealigner tool and a base quality score recalibration (English: Quality Score Recalibration, BQSR for short) tool need to be invoked), and a variant calling stage (a HaplotypeCaller tool needs to be invoked), and the like (different tools invoked by the stages mean different complexities of algorithms used by the stages). Each stage herein is a computing stage described in this embodiment of the present invention.

In a same computing task, different complexities of algorithms are required for different computing stages. Therefore, different computing stages may also require different computing resources during computing. Therefore, in this embodiment of the present invention, the management node needs to establish a resource assessment model according to a data size of the M computing tasks. The resource assessment model is used to assess, according to a size of input data, a resource size of a computing resource required for computing the input data. That is, when a value of a data size is input into the resource assessment model, a value of the resource size may be output. For example, the resource assessment model includes the following formula:

$$C_{new} = [\text{MIN}(C_{max}, \text{MAX}(C_{min}, R*C_{ref}/\text{R\_ref}))] \quad\quad 1\text{-}1$$

In the formula 1-1, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is a task size of the input computing task, $C_{new}$ is an output resource size of the corresponding computing resource, and [ ] is a rounding symbol. A meaning represented by the formula is that when $C_{max} > C_{ref}*R/\text{R\_ref} > C_{min}$, $C_{new} = C_{ref}*R/\text{R\_ref}$; when $C_{ref}*R/\text{R\_ref} \geq C_{max}$, $C_{new} = C_{max}$; or when $C_{ref}*R/\text{R\_ref} \leq C_{min}$, $C_{new} = C_{min}$. Optionally, the resource size of the computing resource may be specifically a CPU resource, a memory resource, a network resource, a GPU resource, an FPGA resource, or the like. When the computing resource is the CPU resource, the resource size may be specifically a quantity of CPU cores. For example, the quantity of CPU cores may be configured as follows: $C_{max}=8$, $C_{min}=1$, and $C_{ref}=4$.

In an optional solution, a same resource assessment model is used for each computing stage. In this case, only one resource assessment model needs to be configured for the management node. In another optional solution, different resource assessment models are used for the computing stages. In this case, multiple different resource assessment models need to be configured for the management node. Optionally, principles of the resource assessment models are all shown in the formula 1-1. However, initial values of $C_{max}$, $C_{ref}$, and $C_{min}$ of the resource assessment models are different.

S402: The management node sends some computing tasks of the M computing tasks and information about the resource assessment model to the target computing node.

Specifically, the management node needs to allocate the M computing tasks to a computing node in the distributed system. It is assumed that the management node allocates some computing tasks to one computing node of the computing nodes, and a quantity of the some computing tasks is greater than or equal to 2. For convenience of description, the computing node may be referred to as a target computing node. In this way, the management node sends the some computing tasks and the information about the resource assessment model to the target computing node. In an optional solution, the management node further allocates an initial computing resource to each computing task of the some computing tasks, and sends, to the computing node, information about the initial computing resource allocated to each computing task of the some computing tasks.

S403: The target computing node receives the some computing tasks and the information about the resource assessment model that are sent by the management node. The target computing node obtains the resource assessment model according to the information about the resource assessment model.

It should be noted that, a resource pool is preconfigured in the target computing node to maintain a computing resource. Usually, the target computing node needs to perform recording in the resource pool, regardless of registering a computing resource, occupying a computing resource, or releasing an occupied computing resource. For example, if an initial quantity of CPU cores is C=0 in the resource pool, and a quantity of registered CPU cores is $C_{reg}=1$, after registration succeeds, a quantity of CPU cores in the resource pool is C=0+1=1. In this way, the target computing node may learn which CPU resources can be currently used by the target computing node.

When the management node does not allocate an initial computing resource to each computing task of the some computing tasks, the target computing node may preconfigure some computing resources for the resource pool for subsequent use. When the management node allocates an initial computing resource to each computing task of the some computing tasks, some computing resources may or may not be preconfigured for the resource pool. Regardless of whether the computing resources are preconfigured, when receiving the information, sent by the management node, about the initial computing resource allocated to each computing task of the some computing tasks, the target node registers, into a preset resource pool for use, the initial computing resource allocated to each computing task. That is, the target computing node integrates the computing resource allocated to each computing task of the some computing tasks, and subsequently performs reallocation.

S404: Before executing each computing stage of a target task, the target computing node substitutes input data of the computing stage into the resource assessment model to compute a resource size of a computing resource required for the computing stage.

Specifically, the target task is any computing task of the some computing tasks. That is, any computing task of the some computing tasks satisfies a characteristic of the target task. The following is described with an example. It is assumed that computing stages of a target task include a computing stage A (such as a repetition marking stage) and a computing stage B (such as a variant calling stage), a size of input data of the computing stage A is 150, and a size of input data of the computing stage B is 125. A resource assessment model of the computing stage A is: $C_{new}=[\text{MIN}(8,\text{MAX}(1,(4*R)/100))]$, and before a computing stage A of the target task is executed, R=150 is substituted into the resource assessment model to obtain $C_{new}=[\text{MIN}(8,\text{MAX}(1,(4*150)/100))]=6$. A resource assessment model of the computing stage B is: $C_{new}=[\text{MIN}(4,\text{MAX}(1,(4*R)/100))]$, and before a computing stage B of the target task is executed, R=125 is substituted into the resource assessment model to obtain $C_{new}=[\text{MIN}(4,\text{MAX}(1,(4*125)/100))]=4$. Therefore, a quantity of CPU cores of a computing resource required for the computing stage A is 6, and a quantity of CPU cores of a computing resource required for the computing stage B is 4.

Figure 5:
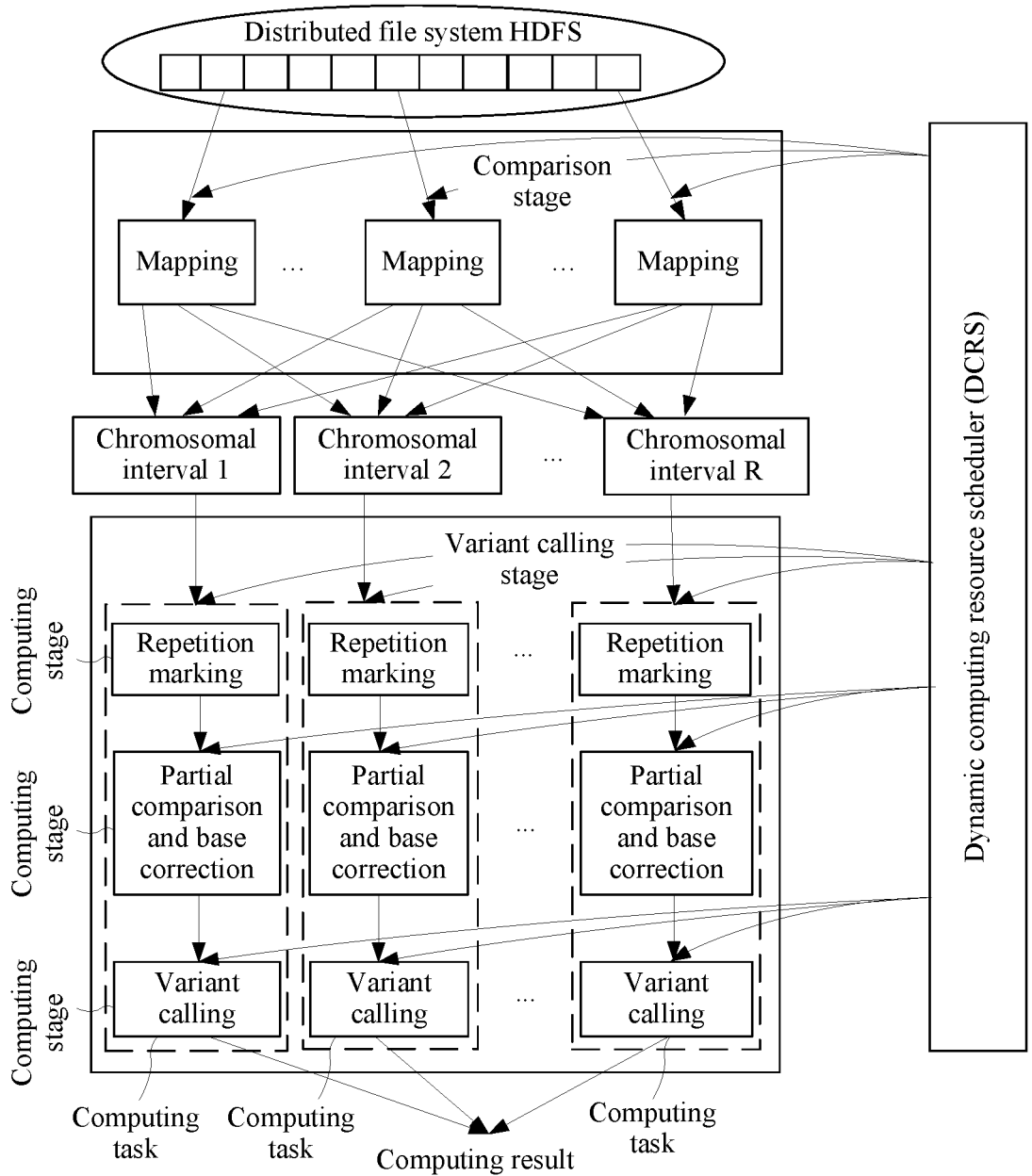
FIG. 5 is a schematic diagram of a scenario for allocating a computing resource according to an embodiment of the present invention.

As shown in FIG. 5, a dynamic computing resource scheduler (English: Dynamic Computing Resource Scheduler, DCRS for short) may be configured in the target computing node. The DCRS may be a virtual module, or may be a physical module. The DCRS may include a resource allocator (Resource Allocator) module and a load estimator (Load Estimator) module. The resource allocator module is configured to manage a computing resource in a resource pool of a computing node, and the load estimator module is configured to: before each computing stage is executed, assess, according to a size of input data of the computing stage, a size of a computing resource required for the computing stage.

S405: The target computing node computes the input data by using a computing resource that is of the resource size and that is in a preset resource pool.

Specifically, after learning a resource size of a computing resource required for a computing stage of the target task, the target computing node occupies a computing resource of the corresponding resource size from the resource pool for use at the computing stage. Optionally, a resource placeholder CPU_CORES may be configured in the target computing node, and a value of the resource placeholder CPU_CORES may be updated before each computing stage is run. The value is used to indicate a resource size of a computing resource required for a computing stage that is to be performed. The value is equal to a resource size of a computing resource that is computed above by using a resource assessment model in real time. According to the example in S404, the target computing node occupies 6 units of computing resources from the resource pool for use at the computing stage A of the target task, occupies 5 units of computing resources from the resource pool for use at the computing stage B of the target task, and occupies 4 units of computing resources from the resource pool for use at a computing stage C of the target task.

In an optional solution, that the target computing node computes the input data by using a computing resource that is of the resource size and that is in a preset resource pool is specifically: determining whether the resource size is less than or equal to a quantity of remaining computing resources in the preset resource pool; or substituting the resource size into a preset priority algorithm to compute a priority of each computing task, and determining whether the priority of the computing task is higher than a preset priority threshold, where the priority is used to reflect significance of the computing task, where optionally, the priority is obtained by dividing the computed resource size by an average value of the resource size, that is, the priority $P_{new}=C_{new}/C_{ref}$; and if the resource size is less than or equal to the quantity of remaining computing resources in the preset resource pool, or the priority of the computing task is higher than the preset priority threshold, computing the input data by using the computing resource that is of the resource size and that is in the resource pool.

In another optional solution, the computing node releases the computing resource of the resource size to the resource pool after completing computing the input data. For example, during a process in which the computing stage A of the target task is run, a size of remaining resources in the resource pool is C=10. After running of the computing stage A of the target task is completed, the computing resource $C_{new}=6$ occupied by the computing stage A is released to the resource pool. In this way, a resource size of remaining computing resources in the resource pool is $C=10+6=16$.

Optionally, when the target computing node previously registers the initial computing resource of each computing task of some computing tasks into the resource pool, if the some computing tasks are all executed, the target computing node may release the initial computing resource of each computing task of the some computing tasks from the resource pool.

In the method described in FIG. 4, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

The foregoing describes the method in the embodiments of the present invention in detail. To better implement the foregoing solutions of the embodiments of the present invention, correspondingly, the following provides an apparatus in an embodiment of the present invention.

Figure 6:
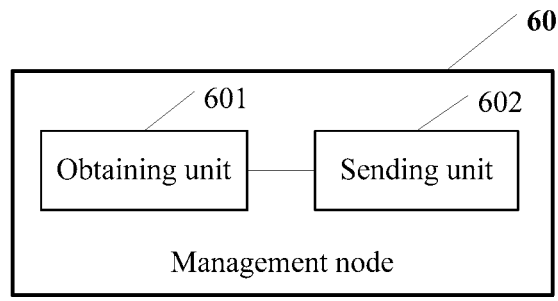
FIG. 6 is a schematic structural diagram of a management node according to an embodiment of the present invention.

Referring to FIG. 6, FIG. 6 is a schematic structural diagram of a management node 60 according to an embodiment of the present invention. The management node 60 is a management node in a MapReduce-based distributed system, and the management node 60 includes an obtaining unit 601 and a sending unit 602. The units are described as follows:

The obtaining unit 601 is configured to: obtain M computing tasks, and establish a resource assessment model according to a data size of the M computing tasks.

The sending unit 602 is configured to send some computing tasks of the M computing tasks and information about the resource assessment model to a target computing node, where each computing task of the some computing tasks needs to be computed by using P computing stages, M is greater than 1, and P is greater than 1. The target computing node is configured to: obtain the resource assessment model according to the information about the resource assessment model, and before executing each computing stage of a target task, substitute input data of the computing stage into the resource assessment model to compute a resource size of a computing resource required for the computing stage. The target computing node is further configured to compute the input data by using a computing resource that is of the resource size and that is in a preset resource pool. The target task is any computing task of the some computing tasks, and the target computing node is a computing node in the MapReduce-based distributed system.

By running the foregoing units, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

In an optional solution, the sending unit 602 is further configured to send, to the computing node, information about an initial computing resource allocated to each computing task of the some computing tasks, so that the computing node registers, into the resource pool for use, the initial computing resource allocated to each computing task.

In another optional solution, the task size includes at least one of a data volume size, a coverage depth, or a record quantity.

In still another optional solution, the computing task includes a map map task or a reduce reduce task.

In yet another optional solution, the resource assessment model is used to assess, according to a size of the input data, a resource size of a computing resource required for computing the input data, where when $C_{max}>C_{ref}*R/R\_ref>C_{min}$, $C_{new}=[C_{ref}*R/R\_ref]$; when $C_{ref}*R/R\_ref \geq C_{max}$, $C_{new}=C_{max}$; or when $C_{ref}*R/R\_ref \leq C_{min}$, $C_{new}=C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

It should be noted that for specific implementation of each unit, reference may further be made to the corresponding description of the method embodiment shown in FIG. 4.

According to the management node 60 described in FIG. 6, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

Figure 7:
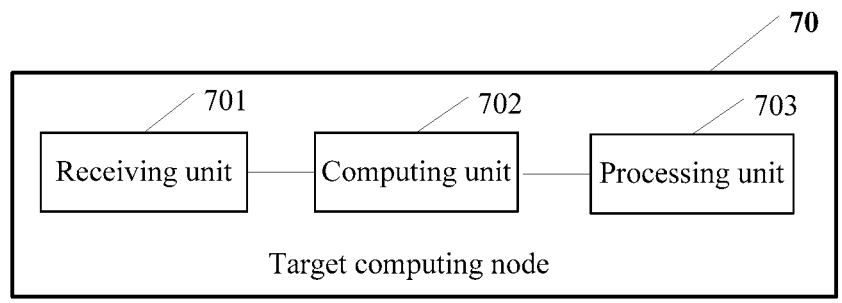
FIG. 7 is a schematic structural diagram of a target computing node according to an embodiment of the present invention.

Referring to FIG. 7, FIG. 7 is a schematic structural diagram of a target computing node 70 according to an embodiment of the present invention. The target computing node 70 is a computing node in a MapReduce-based distributed system, and the target computing node 70 includes a receiving unit 701, a computing unit 702, and a processing unit 703. The units are described in detail as follows:

The receiving unit 701 is configured to receive some computing tasks and information about a resource assessment model that are sent by a management node. The management node is a management node in the MapReduce-based distributed system. The management node is configured to: obtain M computing tasks, and establish the resource assessment model according to a task size of the M computing tasks. The some computing tasks are computing tasks of the M computing tasks, each computing task of the some computing tasks needs to be computed by using P computing stages, M is greater than 1, and P is greater than 1.

The computing unit 702 is configured to: obtain the resource assessment model according to the information about the resource assessment model, and before executing each computing stage of a target task, substitute input data of the computing stage into the resource assessment model to compute a resource size of a computing resource required for the computing stage.

The processing unit 703 is configured to compute the input data by using a computing resource that is of the resource size and that is in a preset resource pool, where the target task is any computing task of the some computing tasks.

By running the foregoing units, the target computing node 70 computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

In an optional solution, the receiving unit 701 is further configured to: receive information, sent by the management node, about an initial computing resource allocated to each computing task of the some computing tasks, and register, into the resource pool for use, the initial computing resource allocated to each computing task.

In another optional solution, the processing unit 703 is specifically configured to: substitute the resource size into a preset priority algorithm to compute a priority of each computing stage, and determine whether the priority of the computing stage is higher than a preset priority threshold, where the priority is used to reflect significance of the computing stage; or determine whether the resource size is less than or equal to a quantity of remaining computing resources in the preset resource pool; and if the priority of the computing stage is higher than the preset priority threshold, or the resource size is less than or equal to the quantity of remaining computing resources in the preset resource pool, compute the input data by using the computing resource that is of the resource size and that is in the resource pool.

In still another optional solution, the target computing node 70 further includes: a release unit, configured to release, after computing the input data is complete, the computing resource of the resource size to the resource pool.

In yet another optional solution, the task size includes at least one of a data volume size, a coverage depth, or a record quantity.

In still yet another optional solution, the computing task includes a map map task or a reduce reduce task.

In a further optional solution, the resource assessment model is used to assess, according to a size of the input data, a resource size of a computing resource required for computing the input data, where when $C_{max} > C_{ref} * R/R\_ref > C_{min}$, $C_{new} = [C_{ref} * R/R\_ref]$; when $C_{ref} * R/R\_ref \geq C_{max}$, $C_{new} = C_{max}$; or when $C_{ref} * R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref} * R/R\_ref]$ represents rounding of $C_{ref} * R/R\_ref$.

It should be noted that for specific implementation of each unit, reference may further be made to the corresponding description of the method embodiment shown in FIG. 4.

According to the target computing node 70 described in FIG. 7, the target computing node 70 computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

Figure 8:
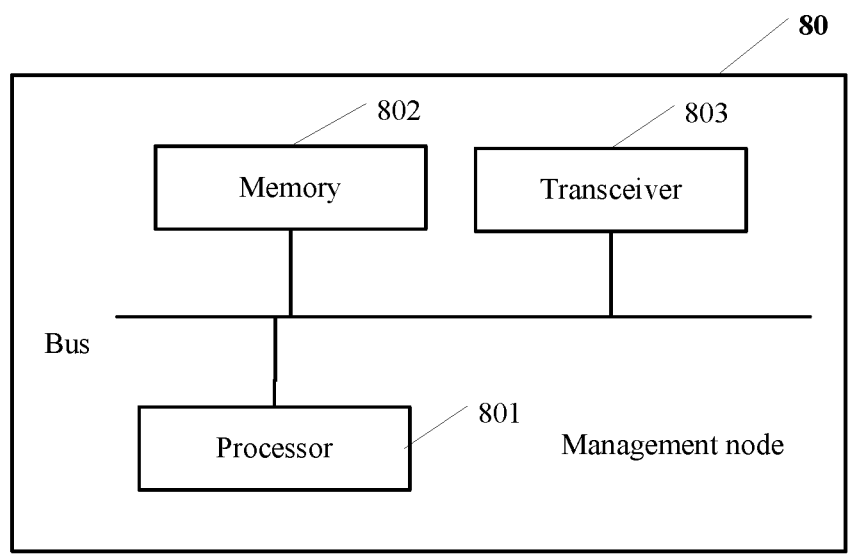
FIG. 8 is a schematic structural diagram of another management node according to an embodiment of the present invention.

Referring to FIG. 8, FIG. 8 shows a management node 80 according to an embodiment of the present invention. The management node 80 is a management node in a MapReduce-based distributed system, and the management node 80 includes a processor 801, a memory 802, and a communications interface 803. The processor 801, the memory 802 and the communications interface 803 are connected to each other by using a bus.

The memory 802 includes but is not limited to a random access memory (RAM), a Read-Only Memory (ROM), an erasable programmable read-only memory (EPROM or flash memory), or a portable read-only memory (CD-ROM). The memory 802 is configured to store a related instruction and data.

The processor 801 may be one or more central processing units (English: Central Processing Unit, CPU for short). When the processor 801 is one CPU, the CPU may be a single-core CPU, or may be a multi-core CPU.

The processor 801 in the management node 80 is configured to read program code stored in the memory 802, to perform the following operations:

obtaining M computing tasks, and establishing a resource assessment model according to a data size of the M computing tasks; and sending, by using the communications interface 803, some computing tasks of the M computing tasks and information about the resource assessment model to a target computing node, where each computing task of the some computing tasks needs to be computed by using P computing stages, M is greater than 1, and P is greater than 1, where: the target computing node is configured to: obtain the resource assessment model according to the information about the resource assessment model, and before executing each computing stage of a target task, substitute input data of the computing stage into the resource assessment model to compute a resource size of a computing resource required for the computing stage; and the target computing node is further configured to compute the input data by using a computing resource that is of the resource size and that is in a preset resource pool, where the target task is any computing task of the some computing tasks.

By performing the foregoing operations, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

In an optional solution, the processor is further configured to send, by using the communications interface 803 to the computing node, information about an initial computing resource allocated to each computing task of the some computing tasks, so that the computing node registers, into the resource pool for use, the initial computing resource allocated to each computing task.

In another optional solution, the task size includes at least one of a data volume size, a coverage depth, or a record quantity.

In still another optional solution, the computing task includes a map map task or a reduce reduce task.

In still yet another optional solution, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

It should be noted that for specific implementation of the operations, reference may further be made to the corresponding description of the method embodiment shown in FIG. 4.

According to the management node 80 described in FIG. 8, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

Figure 9:
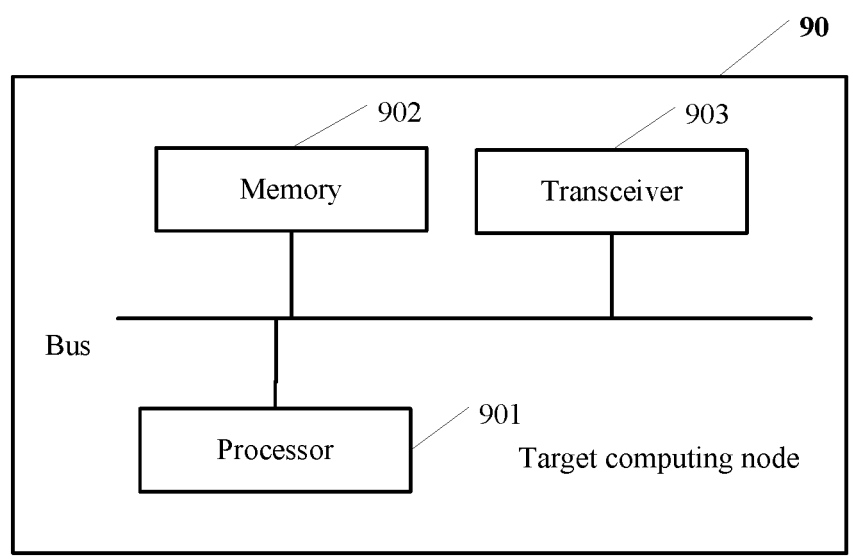
FIG. 9 is a schematic structural diagram of another target computing node according to an embodiment of the present invention.

Referring to FIG. 9, FIG. 9 is a target computing node 90 according to an embodiment of the present invention. The target computing node 90 is a computing node in a MapReduce-based distributed system, and the target computing node 90 includes a processor 901, a memory 902, and a communications interface 903. The processor 901, the memory 902 and the communications interface 903 are connected to each other by using a bus.

The memory 902 includes but is not limited to a random access memory (RAM), a read-only memory (ROM), an erasable programmable read-only memory (EPROM or a flash memory), or a portable read-only memory (CD-ROM). The memory 902 is configured to store a related instruction and data.

The processor 901 may be one or more central processing units (English: Central Processing Unit, CPU for short). When the processor 901 is one CPU, the CPU may be a single-core CPU, or may be a multi-core CPU.

The processor 901 in the target computing node 90 is configured to read program code stored in the memory 902, to perform following operations:

receiving, by using the communications interface 903, some computing tasks and information about a resource assessment model that are sent by a management node. The management node is configured to: obtain M computing tasks, and establish the resource assessment model according to a task size of the M computing tasks, where the some computing tasks are computing tasks of the M computing tasks, each computing task of the some computing tasks needs to be computed by using P computing stages, M is greater than 1, and P is greater than 1;

obtaining the resource assessment model according to the information about the resource assessment model, and before executing each computing stage of a target task, substituting input data of the computing stage into the resource assessment model to compute a resource size of a computing resource required for the computing stage; and computing the input data by using a computing resource that is of the resource size and that is in a preset resource pool, where the target task is any computing task of the some computing tasks.

By performing the foregoing operations, the target computing node 90 computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

In an optional solution, the processor is further configured to: receive, by using the communications interface 903, information, sent by the management node, about an initial computing resource allocated to each computing task of the some computing tasks, and register, into the resource pool for use, the initial computing resource allocated to each computing task.

In another optional solution, that the processor 901 computes the input data by using a computing resource that is of the resource size and that is in a preset resource pool is specifically:

substituting the resource size into a preset priority algorithm to compute a priority of each computing stage, and determining whether a priority of the computing stage is higher than a preset priority threshold, where the priority is used to reflect significance of the computing stage; or determining whether the resource size is less than or equal to a quantity of remaining computing resources in the preset resource pool; and if the priority of the computing stage is higher than the preset priority threshold, or the resource size is less than or equal to the quantity of remaining computing resources in the preset resource pool, computing the input data by using the computing resource that is of the resource size and that is in the resource pool.

In still another optional solution, the processor 903 is further configured to release the computing resource of the resource size to the resource pool after completing computing the input data.

In yet another optional solution, the task size includes at least one of a data volume size, a coverage depth, or a record quantity.

In still yet another optional solution, the computing task includes a map map task or a reduce reduce task.

In a further optional solution, the resource assessment model is used to assess, according to a size of the input data, a resource size of a computing resource required for computing the input data, where when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, $C_{max}$ is a preconfigured upper limit value of the resource size, $C_{min}$ is a preconfigured lower limit value of the resource size, $C_{ref}$ is a preconfigured average value of the resource size, $R_{ref}$ is equal to an average task size obtained by dividing the task size of the M computing tasks by M, R is the size of the input data, and $[C_{ref}*R/R\_ref]$ represents rounding of $C_{ref}*R/R\_ref$.

It should be noted that for specific implementation of the operations, reference may further be made to the corresponding description of the method embodiment shown in FIG. 4.

According to the target computing node 90 described in FIG. 9, the target computing node 90 computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

In conclusion, according to implementation of the embodiments of the present invention, the target computing node computes, at each computing stage of each computing task according to the size of the input data of each computing stage, the computing resource required for the computing stage, and then allocates, according to a computing result, a corresponding computing resource to the computing stage for computing at the computing stage. That is, a computing resource allocated to each computing stage of each computing task is adjusted in real time according to an actual requirement, so that computing resource utilization is improved.

A person of ordinary skill in the art may understand that all or some of the processes of the methods in the foregoing embodiments may be implemented by a computer program instructing relevant hardware. The program may be stored in a computer readable storage medium. During an execution of the program, the processes of the embodiments of the foregoing methods may be included. The foregoing storage medium includes: any medium that can store program code, such as a ROM, a RAM, a magnetic disk, or an optical disc.

What is claimed is:

1. A MapReduce-based distributed system, wherein the system comprises a management node and a target computing node, wherein:
    the management node is configured to:
        obtain M computing tasks, and establish a resource assessment model according to a data size of the M computing tasks; and
        send one or more computing tasks of the M computing tasks and information about the resource assessment model to the target computing node, wherein each computing task of the one or more computing tasks is to be computed by using P computing stages, wherein M is greater than 1, and wherein P is greater than 1; and
    the target computing node is configured to:
        receive the one or more computing tasks and the information about the resource assessment model that are sent by the management node;
        obtain the resource assessment model according to the information about the resource assessment model, and before executing each computing stage of a target task, substitute input data of the particular computing stage into the resource assessment model to compute a resource size required for the particular computing stage; and
        compute the input data by using a computing resource that is of the resource size and that is in a preset resource pool, wherein the target task is any computing task of the one or more computing tasks.

2. The system according to claim 1, wherein:
    the management node is further configured to send, to the target computing node, information about an initial computing resource allocated to each computing task of the one or more computing tasks; and
    the target computing node is further configured to:
        receive the information about the initial computing resource allocated to each computing task; and
        register, into the preset resource pool for use, the initial computing resource allocated to each computing task.

3. The system according to claim 1, wherein the target computing node is configured to perform following steps to compute the input data by using a computing resource that is of the resource size and that is in a preset resource pool:
    substituting the resource size into a preset priority algorithm to compute a priority of each computing stage, and performing one of:
        determining whether the priority of the particular computing stage is higher than a preset priority threshold, wherein the priority is used to reflect significance of the particular computing stage; or
        determining whether the resource size is less than or equal to a quantity of remaining computing resources in the preset resource pool; and
    if the priority of the particular computing stage is higher than the preset priority threshold, or the resource size is less than or equal to the quantity of the remaining computing resources in the preset resource pool, computing the input data by using the computing resource that is of the resource size and that is in the preset resource pool.

4. The system according to claim 1, wherein the target computing node is further configured to release the computing resource to the preset resource pool after completing computing the input data.

5. The system according to claim 1, wherein a size of the target task comprises at least one of a data volume size, a coverage depth, or a record quantity.

6. The system according to claim 1, wherein each computing task comprises a map task or a reduce task.

7. The system according to claim 1, wherein the resource assessment model is used to assess, according to a size of the input data, a resource size of a computing resource required for computing the input data, wherein when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, wherein $C_{max}$ is a preconfigured upper limit value of the resource size, wherein $C_{min}$ is a preconfigured lower limit value of the resource size, wherein $C_{ref}$ is a preconfigured average value of the resource size, wherein $R_{ref}$ is equal to an average task size obtained by dividing the task size of the M computing tasks by M, wherein R is the size of the input data, and wherein $[C_{ref}*R/R\_ref]$ represents rounding of $C_{ref}*R/R\_ref$.

8. A management node, wherein the management node is a management node in a MapReduce-based distributed system, and wherein the management node comprises:
    a receiver, the receiver configured to:
        obtain M computing tasks; and
        establish a resource assessment model according to a data size of the M computing tasks; and
    a transmitter, the transmitter configured to send one or more computing tasks of the M computing tasks and information about the resource assessment model to a target computing node, wherein each computing task of the one or more computing tasks is to be computed by using P computing stages, wherein M is greater than 1, and wherein P is greater than 1, wherein the target computing node is configured to:

obtain the resource assessment model according to the information about the resource assessment model, and before executing each computing stage of a target task, substitute input data of the particular computing stage into the resource assessment model to compute a resource size required for the particular computing stage; and compute the input data by using a computing resource that is of the resource size and that is in a preset resource pool, wherein the target task is any computing task of the one or more computing tasks, and wherein the target computing node is a computing node in the MapReduce-based distributed system.

9. The management node according to claim 8, wherein the transmitter is further configured to send, to the target computing node, information about an initial computing resource allocated to each computing task of the one or more computing tasks, and wherein the target computing node registers, into the preset resource pool for use, the initial computing resource allocated to each computing task.

10. The management node according to claim 8, wherein a size of the target task comprises at least one of a data volume size, a coverage depth, or a record quantity.

11. The management node according to claim 8, wherein each computing task comprises a map task or a reduce task.

12. The management node according to claim 8, wherein the resource assessment model is used to assess, according to a size of the input data, a resource size of a computing resource required for computing the input data, wherein when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, wherein $C_{max}$ is a preconfigured upper limit value of the resource size, wherein $C_{min}$ is a preconfigured lower limit value of the resource size, wherein $C_{ref}$ is a preconfigured average value of the resource size, wherein $R_{ref}$ is equal to an average task size obtained by dividing the task size of the M computing tasks by M, wherein R is the size of the input data, and wherein $[C_{ref}*R/R\_ref]$ represents rounding of $C_{ref}*R/R\_ref$.

13. A target computing node, wherein the target computing node is a computing node in a MapReduce-based distributed system, and wherein the target computing node comprises:

a receiver, the receiver configured to receive one or more computing tasks and information about a resource assessment model that are sent by a management node, wherein the management node is a management node in the MapReduce-based distributed system, and wherein the management node is configured to:
obtain M computing tasks; and
establish the resource assessment model according to a task size of the M computing tasks, wherein the one or more computing tasks are computing tasks of the M computing tasks, wherein each computing task of the one or more computing tasks is to be computed by using P computing stages, wherein M is greater than 1, and wherein P is greater than 1; and at least one processor, the at least one processor configured to:
obtain the resource assessment model according to the information about the resource assessment model, and before executing each computing stage of a target task, substitute input data of the particular computing stage into the resource assessment model to compute a resource size required for the particular computing stage; and compute the input data by using a computing resource that is of the resource size and that is in a preset resource pool, wherein the target task is any computing task of the one or more computing tasks.

14. The target computing node according to claim 13, wherein the receiver is further configured to:
receive information, sent by the management node, about an initial computing resource allocated to each computing task of the one or more computing tasks; and
register, into the preset resource pool for use, the initial computing resource allocated to each computing task.

15. The target computing node according to claim 13, wherein the at least one processor is configured to:
substitute the resource size into a preset priority algorithm to compute a priority of each computing stage, and performing one of:
determine whether the priority of the particular computing stage is higher than a preset priority threshold, wherein the priority is used to reflect significance of the particular computing stage; or
determine whether the resource size is less than or equal to a quantity of remaining computing resources in a preset resource pool; and
if the priority of the particular computing stage is higher than the preset priority threshold, or the resource size is less than or equal to the quantity of the remaining computing resources in the preset resource pool, compute the input data by using the computing resource that is of the resource size and that is in the preset resource pool.

16. The target computing node according to claim 13, wherein the at least one processor is further configured to release, after computing the input data is complete, the computing resource to the preset resource pool.

17. The target computing node according to claim 13, wherein a size of the target task comprises at least one of a data volume size, a coverage depth, or a record quantity.

18. The target computing node according to claim 13, wherein each computing task comprises a map task or a reduce task.

19. The target computing node according to claim 13, wherein the resource assessment model is used to assess, according to a size of the input data, a resource size of a computing resource required for computing the input data, wherein when $C_{max} > C_{ref}*R/R\_ref > C_{min}$, $C_{new} = [C_{ref}*R/R\_ref]$; when $C_{ref}*R/R\_ref \geq C_{max}$, $C_{new} = C_{max}$; or when $C_{ref}*R/R\_ref \leq C_{min}$, $C_{new} = C_{min}$, where $C_{new}$ is the assessed resource size of the computing resource, wherein $C_{max}$ is a preconfigured upper limit value of the resource size, wherein $C_{min}$ is a preconfigured lower limit value of the resource size, wherein $C_{ref}$ is a preconfigured average value of the resource size, wherein $R_{ref}$ is equal to an average task size obtained by dividing the task size of the M computing tasks by M, wherein R is the size of the input data, and wherein $[C_{ref}*R/R\_ref]$ represents rounding of $C_{ref}*R/R\_ref$.

20. A resource allocation method, wherein the method is applied to a MapReduce-based distributed system, wherein the system comprises a management node and a target computing node, and wherein the method comprises:
obtaining, by the management node, M computing tasks, and establishing a resource assessment model according to a data size of the M computing tasks; and
sending, by the management node, one or more computing tasks of the M computing tasks and information about the resource assessment model to the target computing node, wherein each computing task of the one or more computing tasks is to be computed by using P computing stages, wherein M is greater than 1, and wherein P is greater than 1, wherein:
the target computing node is configured to:
obtain the resource assessment model according to the information about the resource assessment model, and before executing each computing stage of a target task, substitute input data of the particular computing stage into the resource assessment model to compute a resource size required for the particular computing stage; and
compute the input data by using a computing resource that is of the resource size and that is in a preset resource pool, wherein the target task is any computing task of the one or more computing tasks.

21. The method according to claim 20, wherein the method further comprises:
sending, by the management node to the target computing node, information about an initial computing resource allocated to each computing task of the one or more computing tasks, and wherein the target computing node registers, into the preset resource pool for use, the initial computing resource allocated to each computing task.

22. The method according to claim 20, wherein a size of the target task comprises at least one of a data volume size, a coverage depth, or a record quantity.

23. The method according to claim 20, wherein each computing task comprises a map task or a reduce task.

24. The method according to claim 20, wherein the resource assessment model is used to assess, according to a size of the input data, a resource size of a computing resource required for computing the input data, wherein when $C_{max} > C_{ref}*R/R\_ref > C_{min}$, $C_{new}=[C_{ref}*R/R\_ref]$; when $C_{ref}*R/R\_ref \geq C_{max}$, $C_{new}=C_{max}$; or when $C_{ref}*R/R\_ref \leq C_{min}$, $C_{new}=C_{min}$, where $C_{new}$ is the assessed resource size of the computing resource, wherein $C_{max}$ is a preconfigured upper limit value of the resource size, wherein $C_{min}$ is a preconfigured lower limit value of the resource size, wherein $C_{ref}$ is a preconfigured average value of the resource size, wherein $R_{ref}$ is equal to an average task size obtained by dividing the task size of the M computing tasks by M, wherein R is the size of the input data, and wherein $[C_{ref}*R/R\_ref]$ represents rounding of $C_{ref}*R/R\_ref$.

25. A resource allocation method, wherein the method is applied to a MapReduce-based distributed system, wherein the system comprises a management node and a target computing node, and wherein the method comprises:
receiving, by the target computing node, one or more computing tasks and information about a resource assessment model that are sent by the management node, wherein the management node is configured to:
obtain M computing tasks; and
establish the resource assessment model according to a task size of the M computing tasks, wherein the one or more computing tasks are computing tasks of the M computing tasks, wherein each computing task of the one or more computing tasks is to be computed by using P computing stages, wherein M is greater than 1, and wherein P is greater than 1;
obtaining, by the target computing node according to the information about the resource assessment model, the resource assessment model, and before executing each computing stage of a target task, substituting input data of the particular computing stage into the resource assessment model to compute a resource size required for the particular computing stage; and
computing, by the target computing node, the input data by using a computing resource that is of the resource size and that is in a preset resource pool, wherein the target task is any computing task of the one or more computing tasks.

26. The method according to claim 25, wherein the method further comprises:
receiving, by the target computing node, information, sent by the management node, about an initial computing resource allocated to each computing task of the one or more computing tasks; and
registering, into the preset resource pool for use, the initial computing resource allocated to each computing task.

27. The method according to claim 25, wherein the computing, by the target computing node, the input data by using a computing resource that is of the resource size and that is in a preset resource pool comprises:
substituting the resource size into a preset priority algorithm to compute a priority of each computing stage, and performing one of:
determining whether the priority of the particular computing stage is higher than a preset priority threshold, wherein the priority is used to reflect significance of the particular computing stage; or
determining whether the resource size is less than or equal to a quantity of remaining computing resources in the preset resource pool; and
if the priority of the particular computing stage is higher than the preset priority threshold, or the resource size is less than or equal to the quantity of the remaining computing resources in the preset resource pool, computing the input data by using the computing resource that is of the resource size and that is in the preset resource pool.

28. The method according to claim 25, wherein the method further comprises:
releasing, by the target computing node, the computing resource to the preset resource pool after completing computing the input data.

29. The method according to claim 25, wherein a size of the target task comprises at least one of a data volume size, a coverage depth, or a record quantity.

30. The method according to claim 25, wherein each computing task comprises a map task or a reduce task.

31. The method according to claim 25, wherein the resource assessment model is used to assess, according to a size of the input data, a resource size of a computing resource required for computing the input data, wherein when $C_{max} > C_{ref}*R/R\_ref > C_{min}$, $C_{new}=[C_{ref}*R/R\_ref]$; when $C_{ref}*R/R\_ref \geq C_{max}$, $C_{new}=C_{max}$; or when $C_{ref}*R/R\_ref \leq C_{min}$, $C_{new}=C_{min}$, where $C_{new}$ is the assessed resource size of the computing resource, wherein $C_{max}$ is a preconfigured upper limit value of the resource size, wherein $C_{min}$ is a preconfigured lower limit value of the resource size, wherein $C_{ref}$ is a preconfigured average value of the resource size, wherein $R_{ref}$ is equal to an average task size obtained by dividing the task size of the M computing tasks by M, wherein R is the size of the input data, and wherein $[C_{ref}*R/R\_ref]$ represents rounding of $C_{ref}*R/R\_ref$.

32. A non-transitory computer readable storage medium storing computer instructions, when executed by at least one processor of a management node, cause the at least one processor to perform operations comprising:
obtaining, by the management node, M computing tasks, and establishing a resource assessment model according to a data size of the M computing tasks; and sending, by the management node, one or more computing tasks of the M computing tasks and information about the resource assessment model to a target computing node, wherein each computing task of the one or more computing tasks is computed by using P computing stages, wherein M is greater than 1, and P wherein is greater than 1, wherein:

the target computing node is configured to:
   obtain the resource assessment model according to the information about the resource assessment model, and before executing each computing stage of a target task, substitute input data of the particular computing stage into the resource assessment model to compute a resource size required for the particular computing stage; and
   compute the input data by using a computing resource that is of the resource size and that is in a preset resource pool, wherein the target task is any computing task of the one or more computing tasks.

33. A non-transitory computer readable storage medium storing computer instructions, when executed by at least one processor of a computing node, cause the at least one processor to perform operations comprising:
   receiving, by the computing node, one or more computing tasks and information about a resource assessment model that are sent by a management node, wherein the management node is configured to:
   obtain M computing tasks; and
   establish the resource assessment model according to a task size of the M computing tasks, wherein the one or more computing tasks are computing tasks of the M computing tasks, wherein each computing task of the one or more computing tasks is computed by using P computing stages, wherein M is greater than 1, and wherein P is greater than 1;
obtaining, by the computing node according to the information about the resource assessment model, the resource assessment model, and before executing each computing stage of a target task, substituting input data of the particular computing stage into the resource assessment model to compute a resource size required for the particular computing stage; and
computing, by the computing node, the input data by using a computing resource that is of the resource size and that is in a preset resource pool, wherein the target task is any computing task of the one or more computing tasks.

* * * * *